US010408061B2

(12) United States Patent
Slavens et al.

(10) Patent No.: US 10,408,061 B2
(45) Date of Patent: Sep. 10, 2019

(54) ARTICLE WITH SECTIONS HAVING DIFFERENT MICROSTRUCTURES AND METHOD THEREFOR

(71) Applicant: United Technologies Corporation, Hartford, CT (US)

(72) Inventors: Thomas N. Slavens, Moodus, CT (US); Mark Zelesky, Bolton, CT (US); Mosheshe Camara-Khary Blake, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 350 days.

(21) Appl. No.: 14/769,800

(22) PCT Filed: Mar. 11, 2014

(86) PCT No.: PCT/US2014/022900
§ 371 (c)(1),
(2) Date: Aug. 22, 2015

(87) PCT Pub. No.: WO2014/150301
PCT Pub. Date: Sep. 25, 2014

(65) Prior Publication Data
US 2016/0003051 A1 Jan. 7, 2016

Related U.S. Application Data

(60) Provisional application No. 61/787,678, filed on Mar. 15, 2013.

(51) Int. Cl.
F01D 5/14 (2006.01)
F01D 9/04 (2006.01)
(Continued)

(52) U.S. Cl.
CPC ............ *F01D 5/147* (2013.01); *B22F 3/1055* (2013.01); *B22F 5/04* (2013.01); *B22F 7/06* (2013.01);
(Continued)

(58) Field of Classification Search
CPC .. B22F 3/1055; B22F 5/04; B22F 7/06; B22F 7/062; B22F 7/08; B23K 1/0018;
(Continued)

(56) References Cited

U.S. PATENT DOCUMENTS 5,273,708 A * 12/1993 Freeman ................... C23C 4/02
419/35
6,173,491 B1 * 1/2001 Goodwater ............. B23P 6/002
29/889.1
(Continued)

FOREIGN PATENT DOCUMENTS

EP 2620594 7/2013

OTHER PUBLICATIONS

The International Search Report and Written Opinion for PCT Application No. PCT/US2014/022900, dated Jul. 24, 2014.
(Continued)

Primary Examiner — Mark A Laurenzi
Assistant Examiner — Paul W Thiede
(74) Attorney, Agent, or Firm — Carlson, Gaskey & Olds, P.C.

(57) ABSTRACT

An article includes a body that has a first section and a second section bonded with the first section. The first section is formed with a first material that has a first microstructure and the second section is formed of a second material that has a second, different microstructure.

5 Claims, 3 Drawing Sheets

(51) Int. Cl.
| | |
|---|---|
| *B23P 15/04* | (2006.01) |
| *B22F 7/06* | (2006.01) |
| *B22F 7/08* | (2006.01) |
| *B22F 5/04* | (2006.01) |
| *B23K 1/00* | (2006.01) |
| *B23K 31/02* | (2006.01) |
| *B22F 3/105* | (2006.01) |
| *B23K 101/00* | (2006.01) |

(52) U.S. Cl.
CPC ............... *B22F 7/062* (2013.01); *B22F 7/08* (2013.01); *B23K 1/0018* (2013.01); *B23K 31/02* (2013.01); *B23P 15/04* (2013.01); *F01D 9/041* (2013.01); *F01D 9/044* (2013.01); *B23K 2101/001* (2018.08); *F05D 2220/32* (2013.01); *F05D 2230/236* (2013.01); *F05D 2230/237* (2013.01); *F05D 2230/60* (2013.01); *F05D 2300/175* (2013.01); *F05D 2300/605* (2013.01); *F05D 2300/606* (2013.01); *F05D 2300/607* (2013.01); *Y02P 10/295* (2015.11)

(58) Field of Classification Search
CPC .............. B23K 2201/001; B23K 31/02; B23K 20/1205; B23P 15/04; B23P 6/002; B29C 67/00; F01D 5/147; F01D 9/041; F01D 9/044; F05D 2220/32; F05D 2230/236; F05D 2230/237; F05D 2230/60; F05D 2300/175; F05D 2300/605; F05D 2300/606; F05D 2300/607; Y02P 10/295
USPC ........... 415/115, 209.4; 29/888.1; 416/213 R
See application file for complete search history.

(56) References Cited

U.S. PATENT DOCUMENTS

| | | | |
|---|---|---|---|
| 7,686,571 | B1 | 3/2010 | Matheny |
| 7,762,781 | B1 | 7/2010 | Brown et al. |
| 7,874,804 | B1 | 1/2011 | Brown |
| 8,257,038 | B2* | 9/2012 | James .................... B22F 5/009 415/215.1 |
| 2003/0217792 | A1 | 11/2003 | James |
| 2007/0163114 | A1 | 7/2007 | Johnson |
| 2009/0269193 | A1 | 10/2009 | LaRose et al. |
| 2010/0266386 | A1* | 10/2010 | Broomer ................ F01D 9/041 415/115 |
| 2011/0142684 | A1 | 6/2011 | Campbell et al. |
| 2011/0206523 | A1* | 8/2011 | Konitzer ............ B23K 20/1205 416/213 R |
| 2011/0243724 | A1 | 10/2011 | Campbell et al. |
| 2011/0297344 | A1* | 12/2011 | Campbell ................ B22C 9/10 164/98 |
| 2011/0311389 | A1 | 12/2011 | Ryan et al. |
| 2012/0003086 | A1 | 1/2012 | Morris et al. |
| 2012/0034101 | A1* | 2/2012 | James ...................... F01D 5/20 416/96 R |
| 2012/0156054 | A1 | 6/2012 | Lacy et al. |
| 2012/0222306 | A1 | 9/2012 | Mittendorf et al. |
| 2013/0015609 | A1* | 1/2013 | Landau ............... B29C 67/0077 264/497 |

OTHER PUBLICATIONS

International Preliminary Report on Patentability for PCT Application No. PCT/US2014/022900 dated Sep. 24, 2015.
European Search Report for European Patent Application No. 14768748 completed Oct. 4, 2016.

* cited by examiner

ARTICLE WITH SECTIONS HAVING DIFFERENT MICROSTRUCTURES AND METHOD THEREFOR

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An article according to an example of the present disclosure includes a body that has a first section and a second section bonded with the first section. The first section is formed of a first material and has a first microstructure and the second section is formed of a second material and having a second, different microstructure.

In a further embodiment of any of the foregoing embodiments, the first microstructure and the second microstructure differ in grain structure.

In a further embodiment of any of the foregoing embodiments, the first material and the second material are metallic alloys.

In a further embodiment of any of the foregoing embodiments, the first section includes a platform and the second section includes an airfoil, the platform being bonded to one end of the airfoil.

In a further embodiment of any of the foregoing embodiments, the second section is metallurgically bonded with the first section.

In a further embodiment of any of the foregoing embodiments, the first microstructure is a non-single crystal microstructure and the second microstructure is a single crystal microstructure.

In a further embodiment of any of the foregoing embodiments, the first material and the second material have equivalent chemical compositions.

In a further embodiment of any of the foregoing embodiments, the first material and the second material have different chemical compositions.

In a further embodiment of any of the foregoing embodiments, the first material and the second material are superalloys.

A method of fabricating an article according to an example of the present disclosure includes forming a first section of a body of an article from a powder of a first material using additive fabrication, the first section having a first microstructure, and bonding the first section with a second section to form the body of the article. The second section is formed of a second material and having a second, different microstructure.

In a further embodiment of any of the foregoing embodiments, the additive fabrication causes the bonding of the first section with the second section.

In a further embodiment of any of the foregoing embodiments, the bonding is conducted after fully forming the first section.

In a further embodiment of any of the foregoing embodiments, the bonding includes bonding the first section with the second section using a technique selected from the group consisting of welding, brazing, adhesive bonding and combinations thereof.

In a further embodiment of any of the foregoing embodiments, the bonding is conducted prior to fully forming the first section.

In a further embodiment of any of the foregoing embodiments, the first section includes a platform and the second section includes an airfoil.

In a further embodiment of any of the foregoing embodiments, the body is an airfoil cluster including at least two airfoils.

In a further embodiment of any of the foregoing embodiments, the body is a rotatable blade.

A further embodiment of any of the foregoing embodiments includes casting the second section, and then forming the first section on the second section using the additive fabrication.

In a further embodiment of any of the foregoing embodiments, the first microstructure is a non-single crystal microstructure and the second microstructure is a single crystal microstructure.

A gas turbine engine according to an example of the present disclosure includes an airfoil assembly that has a body including a first section and a second section bonded with the first section. The first section is formed of a first material and has a first microstructure and the second section is formed of a second material and has a second, different microstructure.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
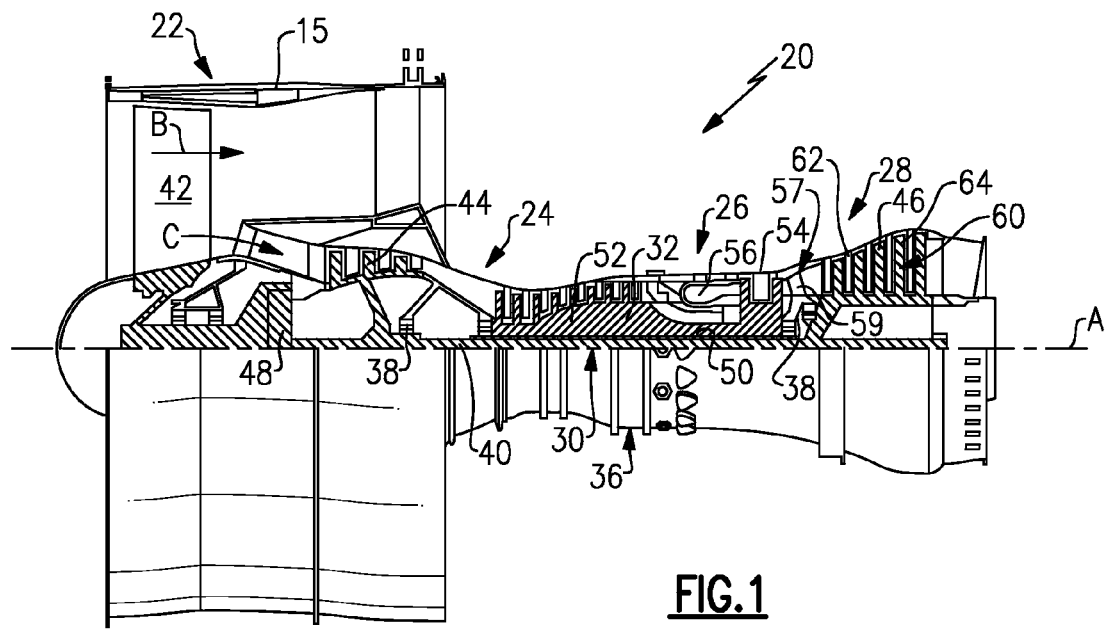
FIG. 1 illustrates an example gas turbine engine.

FIG. 1 schematically illustrates a gas turbine engine 20. The gas turbine engine 20 is disclosed herein as a two-spool turbofan that incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it is to be understood that the concepts described herein are not limited to use with two-spool turbofans and the teachings can be applied to other types of turbine engines, including three-spool architectures and ground-based engines.

The engine 20 includes a low speed spool 30 and a high speed spool 32 mounted for rotation about an engine central axis A relative to an engine static structure 36 via several bearing systems, shown at 38. It is to be understood that various bearing systems at various locations may alternatively or additionally be provided, and the location of the bearing systems may be varied as appropriate to the application.

The low speed spool 30 includes an inner shaft 40 that interconnects a fan 42, a low pressure compressor 44 and a low pressure turbine 46. The inner shaft 40 is connected to the fan 42 through a speed change mechanism, which in this example is a gear system 48, to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged between the high pressure turbine 54 and the low pressure turbine 46. The mid-turbine frame 57 further supports bearing system 38 in the turbine section 28. The inner shaft 40 and the outer shaft 50 are concentric and rotate via, for example, bearing systems 38 about the engine central axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and gear system 48 can be varied. For example, gear system 48 may be located aft of combustor section 26 or even aft of turbine section 28, and fan section 22 may be positioned forward or aft of the location of gear system 48.

The engine 20 in one example is a high-bypass geared engine. In a further example, the engine 20 has a bypass ratio that is greater than about six (6), with an example embodiment being greater than about ten (10), the gear system 48 is an epicyclic gear train, such as a planet or star gear system, with a gear reduction ratio of greater than about 2.3, and the low pressure turbine 46 has a pressure ratio that is greater than about five (5). In one disclosed embodiment, the bypass ratio is greater than about ten (10:1), the fan diameter is significantly larger than that of the low pressure compressor 44, and the low pressure turbine 46 has a pressure ratio that is greater than about five (5). Low pressure turbine 46 pressure ratio is pressure measured prior to inlet of low pressure turbine 46 as related to the pressure at the outlet of the low pressure turbine 46 prior to an exhaust nozzle. The gear system 48 can be an epicycle gear train, such as a planet or star gear system, with a gear reduction ratio of greater than about 2.3:1. It is to be understood, however, that the above parameters are only exemplary and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7° R)]^{0.5}$. The "Low corrected fan tip speed" as disclosed herein according to one non-limiting embodiment is less than about 1150 ft/second.

The engine 20 includes an airfoil assembly 60 (shown schematically). In this example, the airfoil assembly 60 is in the turbine section 28 of the engine 20. However, it is to be understood that the compressor section 24, the fan section 22 or both can also or alternatively include airfoil assemblies according to the present disclosure. As an example, the airfoil assembly 60 can include a non-rotatable vane assembly 62 (FIGS. 2A and 2B) or a rotatable blade assembly 64 (FIG. 3). A plurality of the vane assemblies 62 can be circumferentially arranged with respect to the engine central axis A. Similarly, a plurality of the blade assemblies 64 can be rotatably mounted around the engine central axis A.

Figure 2A:
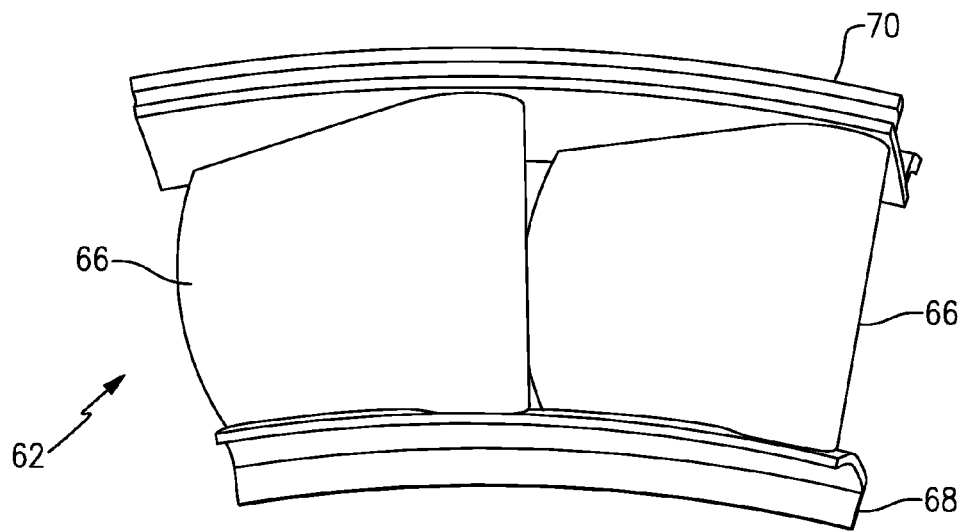
FIG. 2A illustrates a first view of a vane assembly.
Figure 2B:
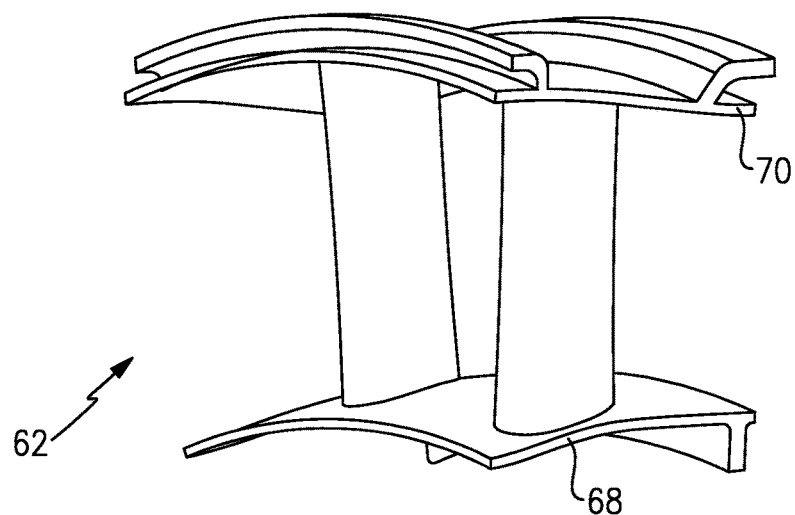
FIG. 2B illustrates a second, different view of the vane assembly of FIG. 2A.
Figure 3:
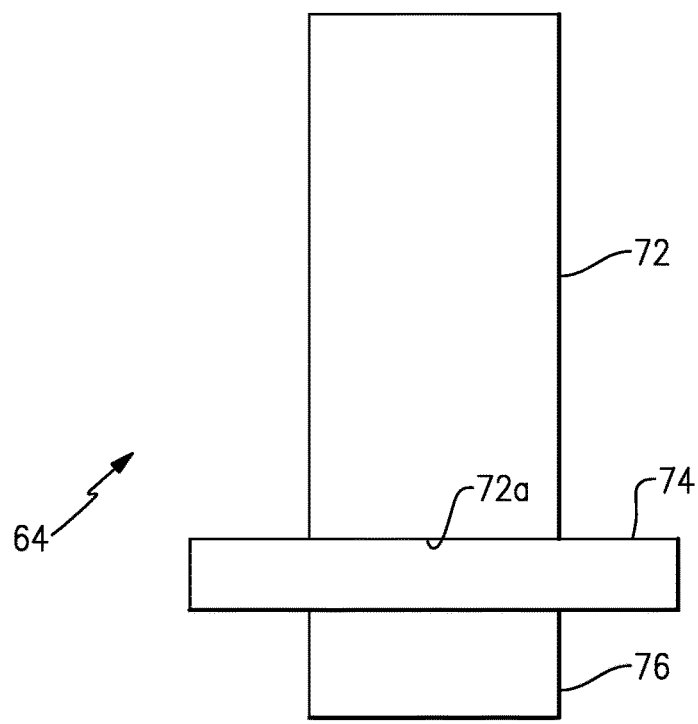
FIG. 3 illustrates a blade assembly.

FIG. 2A shows an isolated view of one of the vane assemblies 62. FIG. 2B shows the vane assembly 62 from a different angle. FIG. 3 illustrates an isolated view of one of the blade assemblies 64. The construction and fabrication of airfoil assemblies are typically expensive due to limitations in the fabrication process. For example, an airfoil assembly can be formed in a casting, such as an investment casting process. The investment casting process can utilize a core within a shell. A molten metal is then poured into the cavity between the core and the shell and solidified to form the airfoil assembly. As can be appreciated, due to the severe environment in which the airfoil assemblies operate in an engine, superalloys are used for high temperature and creep resistance, for example. Additionally, the metal can be cast such that the resulting airfoil assembly includes a single-crystal microstructure, which further improves creep resistance. Investment casting is limited, however, in that the selected microstructure, whether single-crystal or another microstructure, pervades the entire cast component. Thus, a selected design geometry that is difficult to cast in the desired microstructure can lead to a high rejection rate and thus increase processing costs. In this regard, as discussed below, the examples herein teach a multi-technique fabrication process in which a first fabrication technique is used to form one portion of the airfoil assembly and a second, different fabrication technique is used to form another, different portion of the airfoil assembly. Further, due to the use of the different fabrication techniques, the two portions have differing microstructures.

The vane assembly 62 shown in FIG. 2A is a vane "doublet" and includes two airfoils 66 that extend between a radially-inner platform 68 and a radially-outer platform 70. Alternatively, the vane assembly 62 can be a singlet that has only one airfoil 66.

The blade assembly 64 shown in FIG. 3 similarly includes an airfoil 72 and a platform 74 that is attached to a radially inner end of the airfoil 72. In this example, a root 76 extends radially-inwardly from the platform 74 and can be used to mount the blade assembly 64 in a known manner.

Typically, an entire vane assembly or blade assembly would be cast such that the entire component has a relatively homogeneous microstructure. However, it may be difficult to achieve the desired microstructure using casting techniques, particularly in geometrically complex platforms. In this regard, the fabrication of the vane assembly 62 and/or the blade assembly 64 can be split such that the airfoils 66/72 are fabricated using one technique and the platforms 68/70/74 are fabricated using another, different technique. Due to the use of the different techniques, the airfoils 66/72 have a different microstructure than the platforms 68/70/74. As can be appreciated, the resulting microstructures depend upon the selected fabrication techniques.

In one example, the airfoils 66/72 are fabricated using a casting technique, such as investment casting. In a further example, the investment casting technique utilizes a single-crystal fabrication technique to produce the airfoils 66/72 with a single-crystal microstructure. Such casting techniques are known and generally utilize seed crystals or grain selectors to preferably grow a dominant crystal in the cast sections. The platforms 68/70/74 have a different microstructure, such as a non-single crystal microstructure. Although not limited, the microstructure of the platforms 68/70/74 can be an equiaxed grain structure, directionally solidified grain structure or other type of desired grain structure.

In a further example, the vane assembly 62, the blade assembly 64 or both, are formed of one or more metallic materials. As an example, the metallic material or materials can be superalloys, such as nickel- or cobalt-based alloys. Further, because the airfoils 66/72 are fabricated using a different technique than the platforms 68/70/74, different materials can be selected for the airfoils 66/72 and platforms 68/70/74. In this regard, the airfoil 66 can have an equivalent or non-equivalent chemical composition to the platforms 68/70. Similarly, the airfoil 72 can have an equivalent or non-equivalent chemical composition to the platform at 74.

Figure 4:
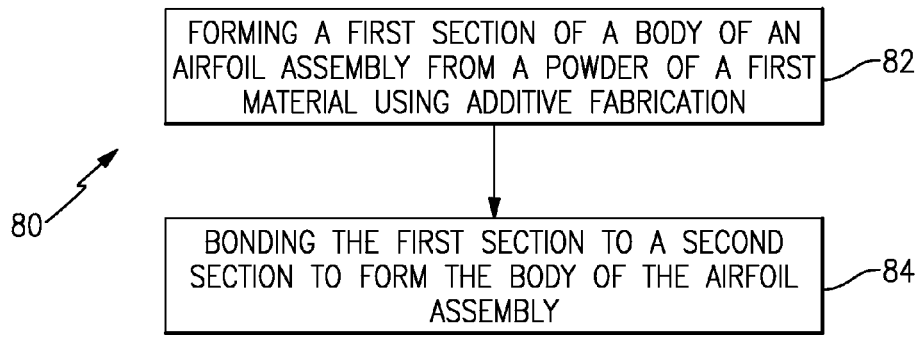
FIG. 4 illustrates an example method of fabricating an airfoil assembly.

FIG. 4 illustrates an example method 80 of fabricating an airfoil assembly 60, such as the vane assembly 62 and/or the blade assembly 64. In this example, the method includes steps 82 and 84, although it is to be understood that the method 80 can be used in combination with other processing steps as desired. In this example, step 82 includes forming a first section of a body of an airfoil assembly from a powder of a first material using additive fabrication. The first section has a first microstructure. Step 84 includes bonding the first section to a second section to form the body of the airfoil assembly. Relative to the vane assembly 62 and the blade assembly 64, the first section of the method 80 can be any of the platforms 68/70/74. The second section can be the airfoils 66/72. A "body" is a main or central foundational part, distinct from subordinate features, such as coatings or the like that are supported by the underlying body and depend primarily on the shape of the underlying body for their own shape.

The following examples illustrate variations that fall within the method 80, explained with respect to either the vane assembly 62 or the blade assembly 64. It is to be understood, however, that the examples are not limited to the vane assembly 62 or the blade assembly 64 and can be applied to other airfoil assemblies.

In general, the examples fall into one of two different categories. The first category is that in which the additive fabrication is used to bond the first section with the second section. The second category is that in which the additive fabrication is not used to bond the first section with the second section.

In one example of the first category with respect to the blade assembly 64, the airfoil 72 is pre-formed prior to the additive fabrication process. For example, the airfoil 72 is investment cast, as described above. The airfoil 72 is then fixtured in an additive fabrication machine and used as a build substrate to form the platform 74 directly on the airfoil 72. That is, the airfoil 72 includes a mating surface or face 72a upon which the platform 74 is formed.

In additive fabrication, powdered material is fed through a machine, which may provide a vacuum, for example. The machine deposits multiple layers of powdered material onto one another. The layers are selectively joined to one another with reference to three-dimensional design information to form geometries that relate to a particular cross-section of the section being formed. The power material is selectively fused and/or sintered using a laser, electron-beam or other type of energy beam, for example. Other layers or portions of layers corresponding to negative features, such as cavities or porosity, are not joined and thus remain as a powdered material. The unjoined power can later be removed using blown air, for example. With the layers built upon one another and joined to one another cross-section by cross-section, a component or portion thereof can be produced. For example, the initial layer or layers that are deposited onto the mating face 72a of the airfoil 72 are fused to one another and also fused to the mating face 72a. In this manner, the platform 74 is bonded to the airfoil 72. The vane assembly 62 can be fabricated in a similar manner.

In one example under the second category with respect to the vane assembly 62, the platforms 68/70 are formed using the additive fabrication process, separate from the airfoils 66, which are separately fabricated using investment casting, for example. In this example, the platforms 68/70 are fully fabricated using the additive fabrication process. After the additive fabrication, the platforms 68/70 can be further processed, such as with machining and heat treatment. After the full formation of the platforms 68/70, the airfoils 66 are then bonded to the platforms 68/70. In examples, the platforms 68/70 are bonded to the airfoils 66 using brazing, welding, adhesive bonding or combinations thereof. As can be appreciated, the blade assembly 64 can be fabricated in a similar manner.

The method 80 not only increases the design space of the parts produced but allows for a much higher degree of manufacturing robustness and adaptability. It further enables the elimination of costly manufacturing tooling and allows for the three-dimensional definition of the part to be made to be the only tooling needed for storage. The method 80 also permits the combination of the high strength of single crystal cast airfoils and the flexibility of additive fabrication to construct the airfoil platforms. This will allow for high-yield casting of the airfoils, components that need the high strength, while decreasing over-all part cost due to low casting yield. The use of additive fabrication also allows for an overall reduction in manufacturing variation due to the elimination of core tolerance, core wear, and core shift within a ceramic mold in an investment casting process. The platforms can also be tailored with advanced cooling geometries because of the flexibility in additive fabrication versus investment casting.

Figure 5:
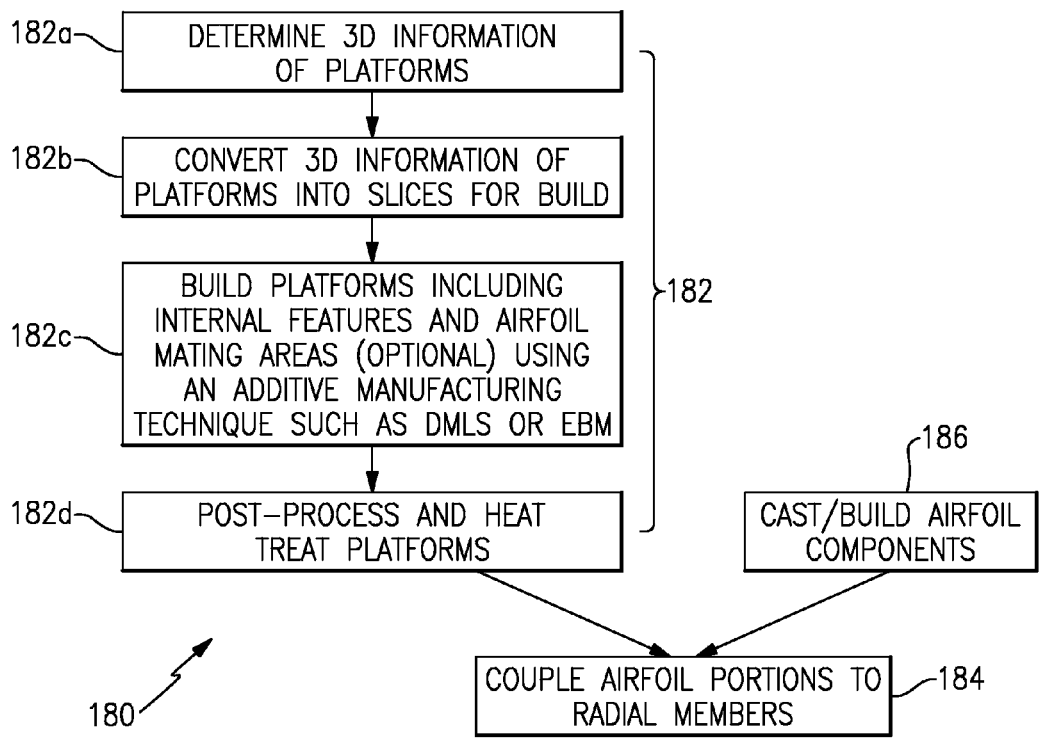
FIG. 5 illustrates another example method of fabricating an airfoil assembly.

FIG. 5 illustrates another example method 180 of fabricating an airfoil assembly 60, such as the vane assembly 62 and/or the blade assembly 64. In this disclosure, like reference numerals designate like elements where appropriate and reference numerals with the addition of one-hundred or multiples thereof designate modified elements that are understood to incorporate the same features and benefits of the corresponding elements. The method 180 includes steps 182, 184 and 186. Steps 182 and 184 correspond, respectively, to steps 82 and 84 as described above. Step 182 includes four-sub steps, including steps 182a, 182b, 182c and 182d. Sub-step 182a includes determining three-dimensional information of the platform or platforms (or first section). Sub-step 182b includes converting the three-dimensional information into slices or cross-sections for build using the additive fabrication process. Sub-step 182c includes forming the platform or platforms (or first section) using the additive fabrication process. Depending upon whether the platform will be built upon an airfoil substrate or separately attached to the airfoil substrate after the additive fabrication, the platform can be formed with an appropriate geometry mating area for subsequent bonding with the airfoil. In sub-step 182d, the platform is further processed after the additive fabrication, such as with machining and heat treatment.

At step 186, the airfoil (or second section) is cast or otherwise formed using a different technique. At step 184, the platform or platforms (first section) and airfoil (second section) are bonded together.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of fabricating an article, the method comprising:
    forming a platform from a powder of a first material using additive fabrication, the platform having a non-single crystal microstructure, the additive fabrication causes bonding of the platform with at least one airfoil, the at least one airfoil being formed of a second material and having a single crystal microstructure, wherein the first material and the second material are metallic alloys and the first material and the second material have equivalent chemical compositions.

2. The method as recited in claim 1, wherein the first material and the second material are superalloys.

3. The method as recited in claim 1, wherein the article is an airfoil cluster including at least two airfoils.

4. The method as recited in claim 1, wherein the article is a rotatable blade.

5. The method as recited in claim 1, further comprising casting the at least one airfoil, and then forming the platform on the at least one airfoil using the additive fabrication.

* * * * *